United States Patent [19]
Baird et al.

[11] Patent Number: 5,261,088
[45] Date of Patent: Nov. 9, 1993

[54] MANAGING LOCALITY IN SPACE REUSE IN A SHADOW WRITTEN B-TREE VIA INTERIOR NODE FREE SPACE LIST

[75] Inventors: Robert Baird, San Jose, Calif.; Gerald P. Bozman, Oakland, N.J.; Nancy Y. Young, San Jose, Calif.

[73] Assignee: International Business Machines Corporation, Armonk, N.Y.

[21] Appl. No.: 514,904

[22] Filed: Apr. 26, 1990

[51] Int. Cl.⁵ .......................... G06F 15/40
[52] U.S. Cl. .................. 395/600; 395/725; 364/DIG. 1; 364/282.1; 364/282.2; 364/283.1
[58] Field of Search .............. 395/725, 575, 600

[56] References Cited

U.S. PATENT DOCUMENTS

| | | | |
|---|---|---|---|
| 4,207,609 | 6/1980 | Luiz et al. | 364/200 |
| 4,611,272 | 9/1986 | Lomet | 364/200 |
| 4,677,550 | 6/1987 | Ferguson | 364/300 |
| 4,750,106 | 6/1988 | Aiken, Jr. | 364/200 |
| 5,043,872 | 8/1991 | Cheng et al. | 395/600 |
| 5,058,002 | 10/1991 | Nakamura et al. | 395/600 |
| 5,063,504 | 11/1991 | Jordan, Jr. | 395/725 |
| 5,089,952 | 2/1992 | Bozman | 395/725 |
| 5,218,696 | 6/1993 | Baird et al. | 395/600 |

OTHER PUBLICATIONS

Bozman, et al., "Method for Obtaining Access to Data Structures Without Locking" U.S. Ser. No. 07/255,000, Filed Oct. 7, 1988.

Robert Sedgewick, "Algorithms", 2nd Edition, copyright 1988 by Addison-Wesley Pub. Co., pp. 259-273, and 602-605.

*Primary Examiner*—Thomas C. Lee
*Assistant Examiner*—Wayne Amsbury
*Attorney, Agent, or Firm*—R. Bruce Brodie

[57] ABSTRACT

A method for managing space re-use with respect to the indices (nodes) of shadow written tree organized dynamic random accessed files/records/pages located in the external store of a CPU. The method reserves space in all non-leaf nodes and maintains a list of available node addresses. When a new node is required then space, if available, is obtained from the parent node list. Only when the parent list becomes exhausted is space (node) obtained from a node inventory manager. Deletion of a node causes its address to be placed on the free or available list maintained by that node's parent. If there is no space, then space on the parent node list is obtained by returning to the inventory manager that node on the list having the least locality with the existing subordinate (children) nodes of the parent.

6 Claims, 6 Drawing Sheets

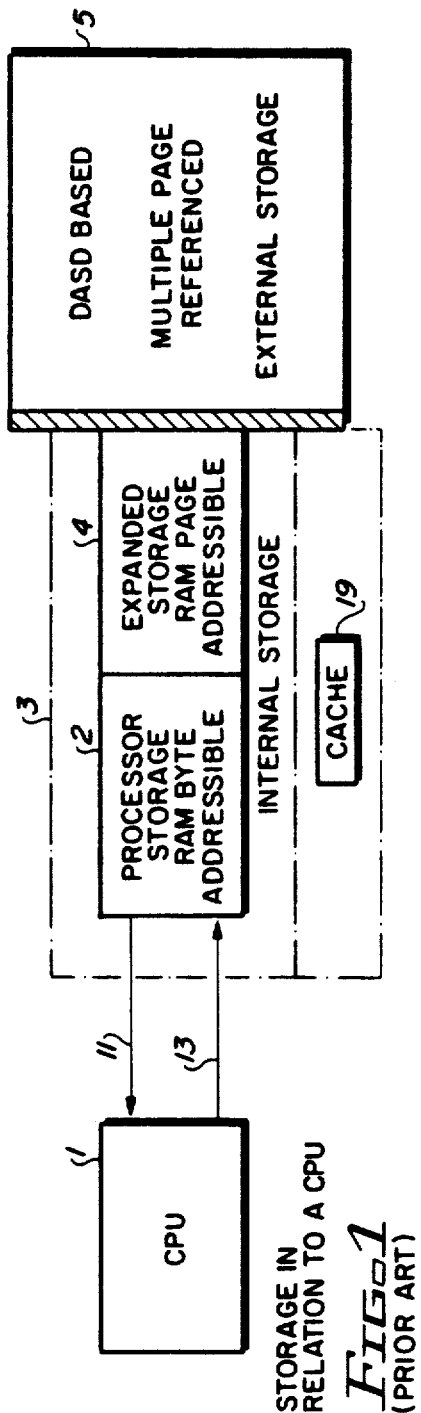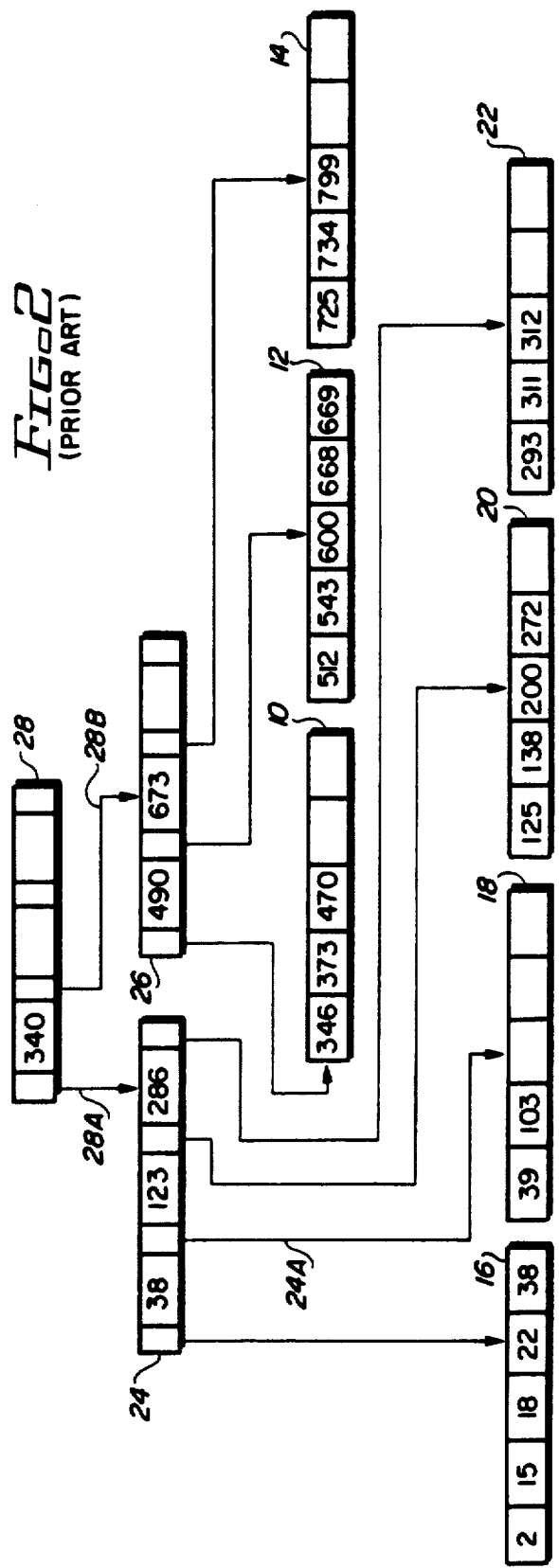

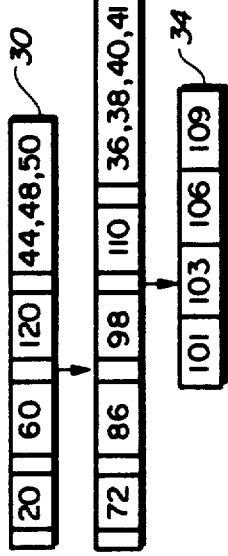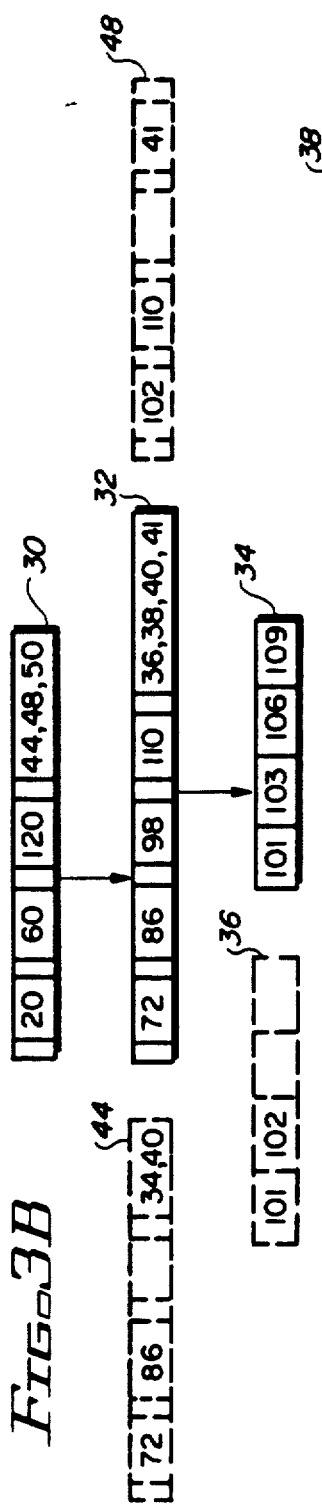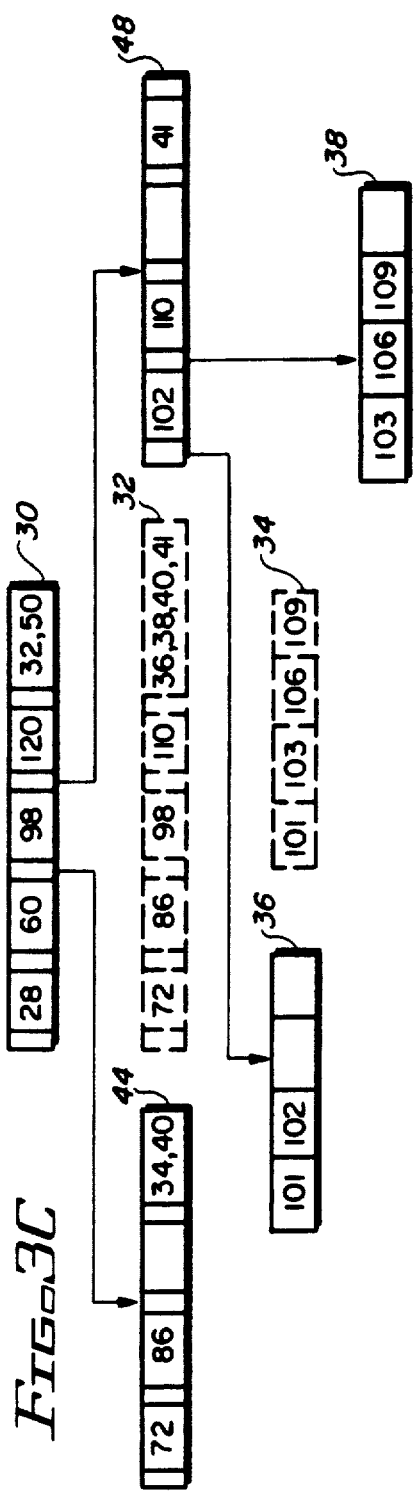
FIG. 3A
FIG. 3B
FIG. 3C

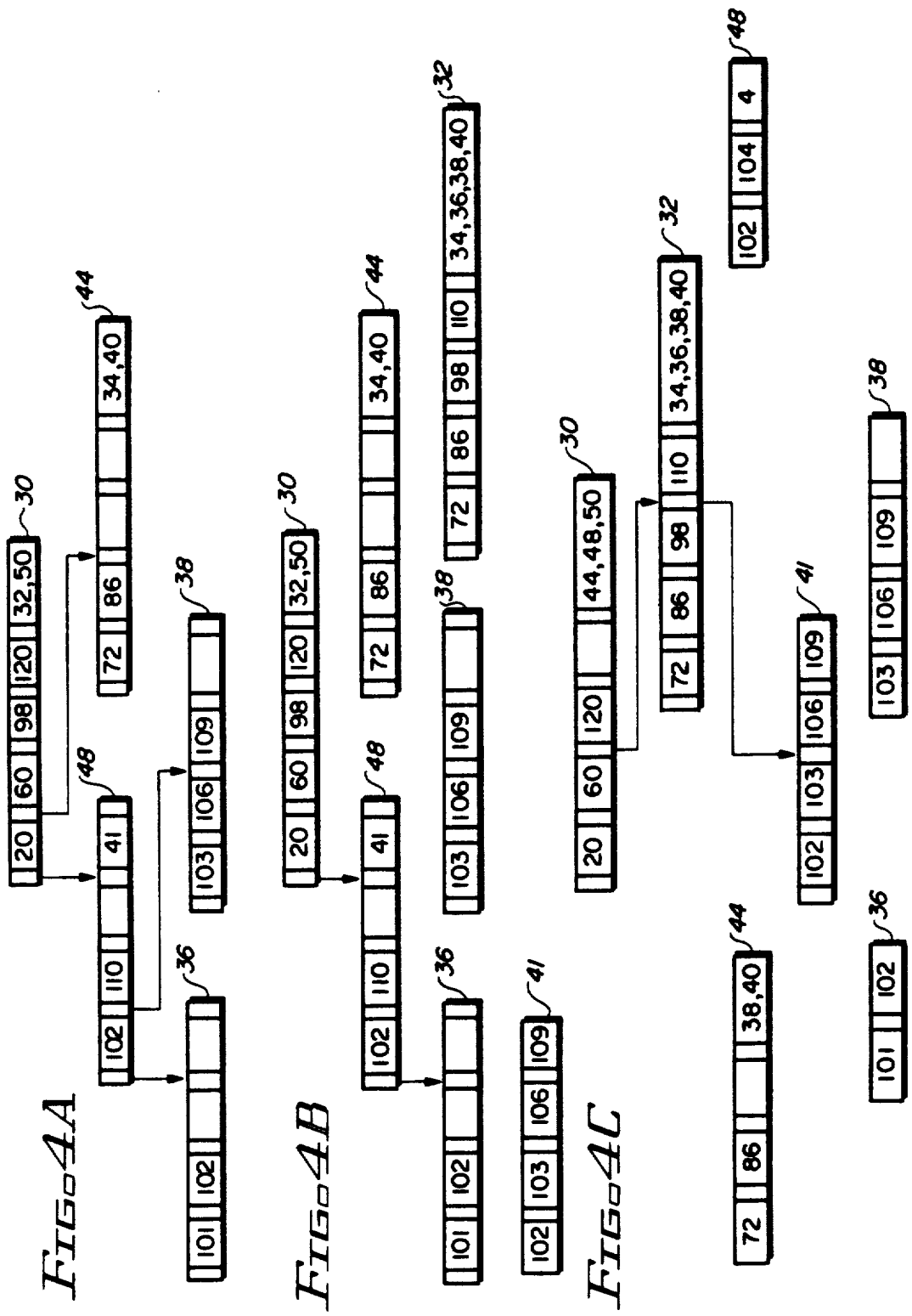

PROCEDURE FOR INSERTING

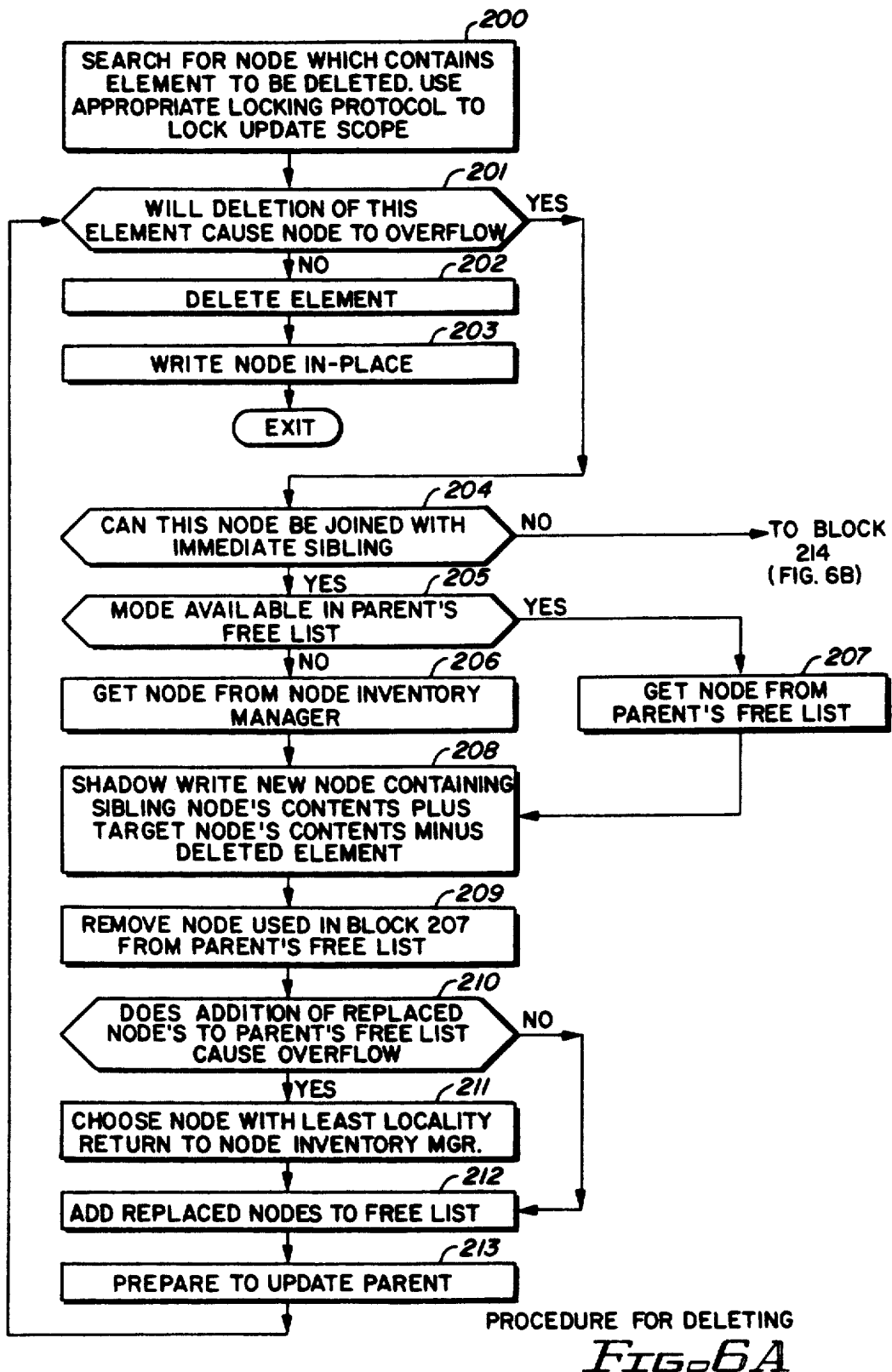
FIG. 6A PROCEDURE FOR DELETING

MANAGING LOCALITY IN SPACE REUSE IN A SHADOW WRITTEN B-TREE VIA INTERIOR NODE FREE SPACE LIST

FIELD OF THE INVENTION

This invention relates to CPU system managed storage, and more particularly, to a method and means for managing space re-use which preserves a degree of locality in tree organized indices on externally stored files.

Description of Related Art

The prior art has recognized the intimate and subtle relationship among storage structures, searching, and access methods. Following are discussions relating a CPU to its storage subsystem and to the B-tree for organizing key oriented files. The files and their indices are accessed dynamically and frequently in random order. One complication arises from the fact that the files and their indices are shadow written. Characteristically, this tends to disrupt locality and space management. That is, contiguous files are scattered as new files are created, old files deleted, and present files updated.

CPU and Some Operating Constituents

A CPU or processor typically includes a local operating system (OS), RAM oriented internal store, local instruction and data caches operatively formed from the internal store, an external store, and lock and cache resource managers.

Applications (processes/tasks) executing on a CPU generate read and write operations by way of the OS. In turn, the read and write operations utilize the data cache and lock resource managers to establish directory lockable access paths to data (pages, records, files) either resident in the data cache or as refreshed into the data cache from the shared external store. The term "directory lockable path" refers to the practice of a lock manager marking access availability to one or more files/records/pages using a directory, indices, or catalog thereby precluding unauthorized access by others. In this regard, the "path to the data" is synonymous with the consecutive mappings starting with a virtual or logical address using directories and the like resulting in the absolute data location in tangible physical internal or external storage.

Internal and External Storage

Because storage costs increase dramatically with speed, many computer systems divide the physical storage subsystem into a number of performance levels. Some of these levels, such as DASD and tape, have been treated as shared access peripheral I/O devices and are accessed over an asynchronous path. Other levels, such as RAM and cache, have been treated directly by system hardware and accessed over a synchronous path as part of internal storage.

The term "internal storage" specifies that portion of storage randomly addressable for single read or write transfers. In IBM systems, internal storage is byte addressable except for an extension ("expanded store"). Expanded store is random accessed on a block or page addressable (4096 bytes/page) basis. It is managed as an LRU real memory backed paging store. Although, the choice of unit of data size or frame is arbitrary. Lastly, "external storage" refers to that bulk portion of storage that is not randomly addressable and must be directly accessed as on DASD.

Aspects of Data Structures, File Storage, and Accessing

A "structure" is a relationship among elements of a group. Thus, a "data structure" implies relationships among elements of data. "Files or data sets" and the subordinate divisions of "records" and "fields" are data structures physically resident on external storage and organized to emphasize access (retrieval) efficiency.

A "field" is a unit of information while a "record" is a collection of related fields treated as a unit. Usually, each record is identified or distinguished from others by a unique numerically coded name or "key". Lastly, a file or data set is a collection of related records be they fixed or variable length. One accessing attribute of interest is the range of key values which may be involved.

Files/records located in either internal or external store can be retrieved in any order either because the position of the record is known or it can be determined from its key. For DASD stored records, there may be a special relationship between a record's key and the key's actual address. This permits a record or file's address to be determined either from a key based computation or table lookup as indexed by its key. Unfortunately, key-to-address computations require a very large address space within which the locations must be scattered so as to minimize collisions.

To avoid having to compute a record's location, a concordance or index of all key values and their corresponding addresses may be constructed and maintained. However, a very large number of records or file's renders an index list unwieldy and substantially increases search/access time to find any given record.

"Indexed sequential file organization" and "trees" are prior art data accessing structures designed to overcome the limitations of the index list. In this regard, indexed sequential file organization requires the file records to be ordered according to their key. Rather than scan an entire file for a particular record, a partial index can be consulted which indicates approximately where to start and how far to continue scanning to ascertain the presence or absence of the record in that file.

A tree imposes a hierarchical order on a collection of items. The tree organization is frequently used to define file directories and to determine access rights and privileges. Structurally, a tree is a type of graph. That is, a collection of nodes and connecting links. A tree consists of one node termed a "root" of in-degree 0 and a successor set consisting of all other nodes of in-degree 1, in-degree referring to the number of links inputting into a node.

To facilitate searching, the nodes of trees are ordered and oriented. The ordering (arbitrarily) may be from left to right such as by way of key values of increasing magnitude. Orientation arises from the existence of a path in a particular direction from any node to its successor node. The ordering and orienting permit recursive scanning.

Records, Files, and Pages Revisited

Fields, records and files (groups of related records) are the storage/information constructs first used in the older literature when storage management was still a function performed by executing applications and reflected DASD/tape drive storage models. Pages and page managed storage are constructs and protocols reflecting the more recent state of the art. In some systems, pages and page managed store operate as a layer on top of records. In that context, pages are assigned a unique key or page ID's, real and virtual storage addresses, and are lockable entities. For examples, a page while defined as 4096 bytes in IBM systems could also be defined in terms of records. One advantage would be that of sub-page locking. In the method of this invention, data structures such as trees used in the storage management of records are likewise susceptible of use with respect to pages in addition to accessing records and files.

Since the unit of addressable storage is a matter of architectural definition and the invention treats the read/write management of addressable storage through indices, it shall be assumed through the remainder of the specification that file/records/pages are synonymous. If the storage manager is page oriented, then pages are the unit of addressable storage and page ID are treated as the key for index use. Likewise, if the storage manager is record or file oriented then the corresponding unit should be considered as the unit of addressable storage.

B-Trees

In the prior art, a "B-tree" is one which is either an empty tree, or, a tree in which every node has either no successor or at most two immediate successors. As used, a B-tree is a data structure permitting retrieval, insertion, or deletion of records from files located on external store with a guaranteed worst case performance. In this sense, a B-tree finds application as a hierarchical index to record keys and associated attributes (location pointers) or as a dictionary where the keys are words or symbols.

A "leaf searchable" B-tree, as used in this invention, is also described in copending Bozman et al, U.S. Pat. No. 5,089,952, "Method for Obtaining Access to Data Structures Without Locking".

According to the Bozman reference, a leaf searchable B-tree is one in which all record keys and associated attributes appear in the external nodes (leaves) and the internal nodes contain separator keys (routers) which define a path to the leaves. Other constraints imposed upon leaf searchable B-trees of order m (maximum number of successors) include:

(1) that the tree must be compact;
(2) each internal node has AT MOST m successors;
(3) each internal node except for the root has AT LEAST m/2 successors;
(4) the root node has AT LEAST two successors;
(5) the path length from the root node to each external node is the same; and
(6) all external nodes (leaves) contain X keys or data elements lying in the range $(m'/2)<X<(m'-1)$, where m' has no necessary formal relation to m.

B-Trees In Pertinent Prior Art

The above identified Bozman reference discloses a method for reading leaf searchable B-tree organized indices defined onto dynamic random access files without the use of locks. However, writing or updating the indices still requires locking the file/record/page. In Bozman et al, the leaf searchable trees are organized such that all interior nodes include routing pointers and synchronization values. Central to the method is that of recursively comparing the synchronization values exhibited by each pair of contiguous hierarchically spaced nodes within the subtree counterpart to a target node until either the target key has been obtained, the paths exhausted, or the method terminates.

Sedgewick, "Algorithms", 2nd Edition, copyright 1988 by Addison-Wesley Pub. Co., (pages 259-273, and 602-605) is cited for the teaching of B-trees as an expandable and amendable form of file directory wherein each node includes a record key value, the nodes being magnitude ordered in a predetermined manner to facilitate searching. Sedgewick varies the ordering to assure optimality as for instance supporting dynamic programming search algorithms.

Lomet, U.S. Pat. No. 4,611,272, "Key Accessed File Organization", issued Sep. 9, 1986, describes a two level index oriented file. The index level accepts a varying number of pages. Access to the pages is met by a hash computation rather than increasing the index size.

Ferguson, U.S. Pat. No. 4,677,550, "Method of Compacting and Searching a Data Index", issued Jun. 30, 1987, teaches that generating and saving relative magnitude pointers derived from keys associated with a leaf oriented multi-way search tree can shorten subsequent access paths to data as a function of the density of the derived pointers. In this regard, Ferguson associates the pointer and the record location for each successive pair of search keys.

Shadow Writing

The term "shadow writing" refers to the practice that when an updated object is first written to external store, the system doesn't overwrite the original object, instead, the updated object is written elsewhere on external store and the counterpart directory is changed to point to the updated object. The old object is the "shadow" of the updated object.

An example of shadow writing and its use in recovery of a prior information state of a system may be found in Aiken, U.S. Pat. No. 4,750,106, "Disk Volume Data Storage and Recovery Method", issued Jun. 7, 1988.

Aiken positions a dual or shadow copy of a DASD based tree organized index at a known offset from a first DASD copy in a relatively primitive storage management system. In such systems, index maps point to the DASD location of text streams and other objects. If the map is defective, then the objects cannot be accessed. Upon detection of "map" error, the shadow or backup copy can be invoked to aid location and recovery.

Space Management and Shadow Written Elements of B-Trees

While a process can only read or write one page or record at a time, it can have multiple pages or records accessible in a cache in internal store. When a process modifies a tree node, it actually operates on a private copy within an internal memory buffer assigned thereto. The changed node is introduced into the B-tree by way of writing it through cache to a new address in external store with the concomitant change in tree pointers thereto. Also, it has been known to track B-tree node changes (insertions/deletions) using a map and resource manager separate from the B-tree.

One disadvantage in shadow writing in maintaining B-trees is that external store space must be allocated by the storage manager portion of the operating system for the updated or added data, and, de-allocated for the old data of the changed node. The storage manager is invoked and incurs the processing cost of finding and returning nodes, and either logging the current allocation state to external store or periodically using a "garbage collection process" in order to reclaim available space.

Another disadvantage is that shadow writing destroys any physical clustering that may have existed in the data as a consequence of a succession of node additions, deletions, and modifications. This can cause a loss of performance when data are read sequentially.

SUMMARY OF THE INVENTION

It is accordingly an object of this invention to devise a method for reducing the CPU overhead in the management of storage space incurred with respect to the indices (nodes) of shadow written tree organized random accessed records, pages, and files resident in external storage.

It is a related object to devise a method for managing the reuse of storage space with respect to shadow written B-trees while maintaining a physical clustering of added and updated nodes thereto.

The foregoing objects are satisfied by a method for managing insertion and deletion of keys in B-tree organized indices of files defined and shadow written onto a system managed storage (SMS) portion of a computing system, said SMS establishing index lockable paths to said files.

The method is operative where each B-tree index includes a root node, interior noes, and exterior nodes, and, where all keys to the files appear in the exterior nodes (leaves), all interior (non-leaf) nodes include routing pointers and synchronization values. The method provides, in response to the insertion and deletion of nodes, that selected nodes may be split (split ops) or combined (join ops) in order to avoid overflow or underflow of nodes, whose associated information capacity is bounded. The method further provides that the updating or deletion of any file results in the corresponding alteration of the synchronized values of nodes in the access paths to those external nodes containing keys to the updated file.

The method comprises the steps of: (a) defining leaf search B-tree paths to data stored in SMS; (b) defining free space lists of finite capacity (also termed bounded lists) and associated with counterpart non-leaf nodes of the B-tree; and (c) re-using the space assigned to a non-leaf node when that node is the predecessor of now extinguished subordinate or successor nodes, the space re-use being responsive to dynamic changes in the B-tree caused by node split and join operations on successor nodes to the predecessor node maintaining the list. The split and join operations are used to prevent overflow or underflow conditions of the lists. The operations are so constrained to maintain the leaf nodes in as contiguous locations (addresses) in SMS as possible.

Restated, the method of this invention reserves space in all non-leaf nodes of a shadow written B-tree and maintains a concomitant list of available node addresses. When a new node is required, then space is obtained from a space available node list associated with the predecessor (parent) to the new node. Only when the parent list becomes exhausted is space (node) obtained from a node inventory manager. Deletion of a node causes its address to be placed on the free or available list maintained by that node's parent. If there is no space, then space on the parent node list is obtained by returning to the inventory manager that node on the list having the least locality with the existing subordinate (children) nodes of the parent.

In this invention the node create and the node delete operations are atomic. By this, it is meant that if these operations are interrupted then the B-tree state is rolled back to what it was immediately prior to invocation of the node create or delete operation. That is, in the absence of atomic operations a set of sub-operations would upon interruption cause a system to assume an ambiguous intermediate state. Bundling steps or sub-steps together so that they are executed as a unit, or, not at all i.e. executing atomically, guarantees should an interruption occur, then the state of the object being operated upon would be rolled back to its state immediately prior to initiation of the steps of substeps. The node create and the node delete operations include among their indivisible steps are the steps of changing indices, lists, and pointers as where space used by subordinate (now extinguished) nodes is returned back into the free space list of a parent node.

BRIEF DESCRIPTION OF THE DRAWING

FIG. 1 sets out the organization of storage in relation to a large main frame CPU according to the prior art.

FIG. 2 depicts a fourth order (m=4) B-tree index including root, interior, and exterior nodes defined onto external storage according to the copending Bozman application.

FIGS. 3A-3C shows a static insertion of nodes onto the tree modified over the copending Bozman application according to the method of this invention.

FIGS. 4A-4C illustrates a static deletion of nodes from the tree modified over Bozman et al. according to the method of this invention.

FIGS. 6A-6B sets forth the flow of control effectuating node deletion in FIGS. 4A-4C.

DESCRIPTION OF THE PREFERRED EMBODIMENT

Figure 5:
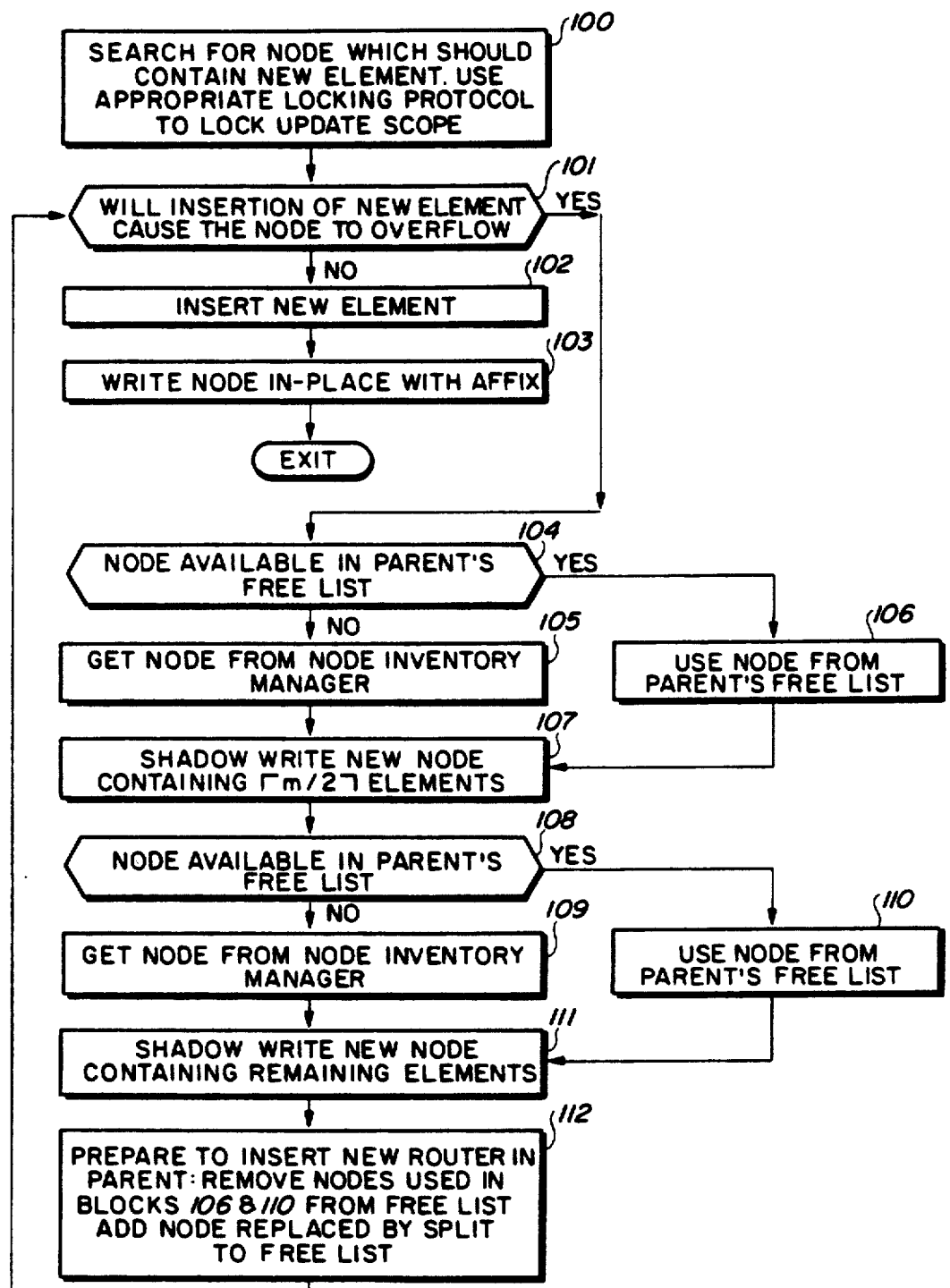
FIG. 5 sets forth the flow of control effectuating node insertion in FIGS. 3A-3C.

The Host CPU Environment for Executing the Method of the Invention

The invention can be conveniently practiced in a configuration in which each CPU in the system is an IBM/360 or 370 architected CPU type having an IBM MVS operating system. An IBM/360 architected CPU is fully described in Amdahl et al, U.S. Pat. No. 3,400,371, "Data Processing System", issued on Sep. 3, 1968. A configuration involving CPU's sharing access to external storage is set forth in Luiz et al, U.S. Pat. No. 4,207,609, "Path Independent Device Reservation and Reconnection in a Multi-CPU and Shared Device Access System", filed May 8, 1978, issued Jun. 10, 1980.

An MVS operating system is also set out in IBM publication GC28-1150, "MVS/Extended Architecture System Programming Library: System Macros and Facilities", Volume 1. Details of standard MVS or other operating system services such as local lock management, sub-system invocation by interrupt or monitor, and the posting and waiting of tasks is omitted. These OS services are believed well appreciated by those skilled in the art.

Some Relations Among CPU's, Caches, and Storage

Referring now to FIG. 1, there is shown the relationship of organized storage to the CPU. As depicted, CPU 1 accesses both internal storage 3 and external storage 5 over paths 11 and 13. Internal storage 3 includes processor storage 2 and expanded storage 4. In this regard, processor store operates on a byte addressable random access while the expanded store operates on a file/record/page addressable random access basis. External storage 5 comprises one or more DASD and stores the file/record/page of the information referenced by applications executing on CPU 1.

Typically, an application invoking the CPU processor would reference a file/record/page by either its virtual/linear or real space address to a cache. In this regard, cache 9 could be hardware or software implemented. If software implemented, the cache could be located anywhere in internal storage 3. If the file/record/page is not available in cache 9, then either expanded storage 4 or external storage 5 need be accessed.

Where multiple file/record/pages are accessed across the I/O boundary 7 in external storage, they may be processed according to methods as set forth in the above-mentioned Luiz patent. Parenthetically, when a access is made to internal storage the processor waits until the access is completed. When access is made across the I/O boundary, the processor invokes another task or process while awaiting fetch (access) completion.

The Leaf Searchable B-Tree and Routing Scheme as Used in the Invention

Referring now to FIG. 2, there is shown a leaf searchable B-tree with $m=4$ and $m'=6$. The root node 28 is in-degree 0 while all of the remaining nodes 10–26 are in-degree 1. Note, nodes 24 and 26 are interior while nodes 10–22 serve as exterior or leaf nodes. Associated with the root and each interior node are pointers to successor (exterior) nodes. Thus, node 24 has pointers to each of the leaf nodes 16–22. Likewise, node 26 includes pointers to leaf nodes 10–14. It so happens that the keys are arranged in ascending order among the leaf nodes 16–22, and 10–14.

Operations on Indices and Other Addressable Files/Records/Pages

As is pointed out in the copending Bozman et al, U.S. Pat. No. 5,089,95 "Method for Obtaining Access to Data Structures Without Locking", operations are frequently defined onto addressable objects. These include INSERT; DELETE; FIND; and NEXT. The INSERT operation adds a new file/record/page to the tree and associating therewith a unique key. The DELETE operation removes a file/record/page from the tree indicated by the key. The FIND operation retrieves a file/record/page while the NEXT operation retrieves indicia of other file/record/pages.

In its discussion of locking and its relation to leaf searchable B-tree organized indices, the Bozman et al reference introduced the following concept. For any updater U, there exists a node which is the root of a minimal subtree. The minimal subtree completely contains all structural and data changes that will result from the update operation. The "minimal subtree" is called the "deepest safe node" for U. Also, the path from node U to a leaf is called the "scope" of U. Relatedly, a node in a B-tree is deemed "insertion safe" if it is not full. That is, the node has less than $(m-1)$ keys associated with it. Similarly, a node is deemed "deletion safe" if it is not minimal i.e. has more than $[(m/2)-1]$ keys associated therewith.

Updating (Insert/Delete) a Shadow Written B-tree That Never Contains Redundant Data and is Always Consistent The INSERT Process:

Before changing the B-tree, an INSERT process first locks its scope using a locking protocol. As a result, the subtree whose root is the deepest safe node will remain locked when the insertion point is found. This subtree will be a safe leaf node in which the new key and data can be inserted without causing an overflow. Otherwise, the subtree is the deepest safe node which is the parent of a descendant path that is not insertion-safe and will therefore result in node split(s) due to the insertion.

The traditional way of accomplishing node splits due to insertion is to split the leaf node which is receiving the new key/data into nodes containing either $(m'/2)$ key/data elements each (if there are an even number of elements) or $[(m'/2)-1]$ and $(m'/2)$ key/data elements respectively (if there are an odd number of elements), and add the new element to the appropriate node. This then causes the propagation of a router/pointer element to the parent, which will cause overflow if the parent is not insertion-safe. Therefore, this "upward" propagation can occur recursively until the deepest insertion-safe node is reached.

In Bozman et al, the traditional method is modified by the use of shadow updating as follows:

If the leaf node is "insertion safe" (i.e. node in an m order B-tree is not full in that it has less than $m-1$ elements assigned to it), then the new data is inserted and the leaf node is written to its existing location on secondary storage (i.e. "in-place"). Otherwise, for each splitting node up to the deepest insertion-safe node, the two new nodes replacing the former node are written to new secondary storage locations rather than their existing location. That is, both nodes resulting from the split are written in their final form to new secondary storage locations leaving the B-tree in its former consistent state. They are connected to the tree by the insertion of the new router into an insertion-safe node along with the two new pointers. The insertion-safe node is then written to its existing location on secondary storage. As a result of this operation, the B-tree is transformed into its new consistent state.

Referring now to FIGS. 3A–3C, there is depicted an arbitrary portion of a B-tree. The figures diagrammatically exhibit the solution for element insertion of a node in the tree according to the Bozman reference as modified for purposes of this invention.

Referring now to FIG. 3A, there is shown a portion of an $m=4$ order B-tree before the insertion of element 102. Note, that the invention uses a list of free or available nodes appended to each of the internal nodes. Nodes in the free list are depicted as a list at the right end of each non-leaf node. Illustratively, the insertion-safe node (30) has nodes 44, 48 and 50 available in its free list. The internal node 32 has free list nodes 36, 38, 40 and 41 available.

Referring now to FIG. 3B, there is set out the state after the new shadow updated nodes (resulting from the overflows) have been written, but before they have been connected to the insertion-safe node 30. The two new leaf nodes 36 and 38 have been allocated from the free list of their parent (32). The two new internal nodes 44 and 48 have been allocated from the free list of node 30.

Referring now to FIG. 3C, there are shown the shadowed nodes which have been connected to node 30 via the insertion of key 98 and its two adjacent pointers. The former path is now disconnected from the tree. Note that the free lists have been updated to reflect the removal of the newly allocated nodes and the return of the disconnected nodes.

The DELETE Process:

As described in the co-pending Bozman application, DELETION is managed as follows:

If the node formerly containing the deleted element does not underflow as a result of its deletion, then that node is written in-place and the process is done. Otherwise the immediate successors that receive(s) the merging elements is (are) shadow updated by being written to new secondary storage allocations.

If this merging procedure is terminated by a key rotation, then the successors involved in the rotation are also shadow updated. In this case, the parent involved in the key rotation is written in-place thereby connecting the new nodes to the tree. If this merging procedure is completed by a deletion in a deletion-safe node then the new shadow-written branch is connected to the tree at this time and the deletion-safe node is written in-place.

Referring now to FIGS. 4A-4C, there is depicted a connected node version of the tree shown in FIG. 3C on which the deletion operation is to be executed. The deletion operation utilizes technique of the copending Bozman application as modified for this invention.

Referring now to FIG. 4A, there is shown a portion of a B-tree before the deletion of element 101. Nodes in the free list are depicted as a list at the right end of each non-leaf node. The insertion-safe node (30) has nodes 32 and 50 available in its free list. The internal node 44 has free list nodes 34 and 40 available. The internal node 48 has free list node 41 available.

Referring now to FIG. 4B, the two new shadow updated nodes 32 and 41 resulting from the underflow of the leaf and its parent are dotted. Note that node 32 was obtained from the free list of its parent, node 30 and likewise node 41 was obtained from its parent, node 48.

Referring now to FIG. 4C, the portion of the B-tree is shown after the rotation has connected the shadowed nodes. The former nodes that are now disconnected are dotted. Note that the free lists have been updated to reflect the removal of the newly allocated nodes and the return of the disconnected nodes.

Illustrative Example of the Method of the Invention

Referring now to FIG. 5, there is depicted method steps for inserting a new element in the B-tree. The standard B-tree search technique is used to find the leaf node that is to contain the new element (100). An appropriate locking protocol locks the update scope.

If the insertion of the new element will not cause an overflow in the node then the new element is inserted and the node is written in-place (101-103). If the insertion causes an overflow then the following is done iteratively until an insertion-safe node is found (104-112, 101):

(1) If a node is available in the parent's free list, use it (106). Otherwise get a new node from the node inventory manager (105).
(2) Shadow write one of the key/data elements (107).
(3) If a node is available in the parent's free list for the remaining node, use it (110). Otherwise get a new node from the node inventory manager (logic block 109).
(4) Shadow write the last node of the pair, containing the remaining key/data elements (111).
(5) Inserting a new router in parent by:
 (a) removing any nodes obtained in 106 and 110 from the free list.
 (b) adding the node replaced by the split to the free list.
(6) If the parent is not insertion-safe (101), then using the parent node go to 1 above (104).

When this is completed the new router is inserted into the insertion-safe node and the node is written in-place (103).

Figure 6B:
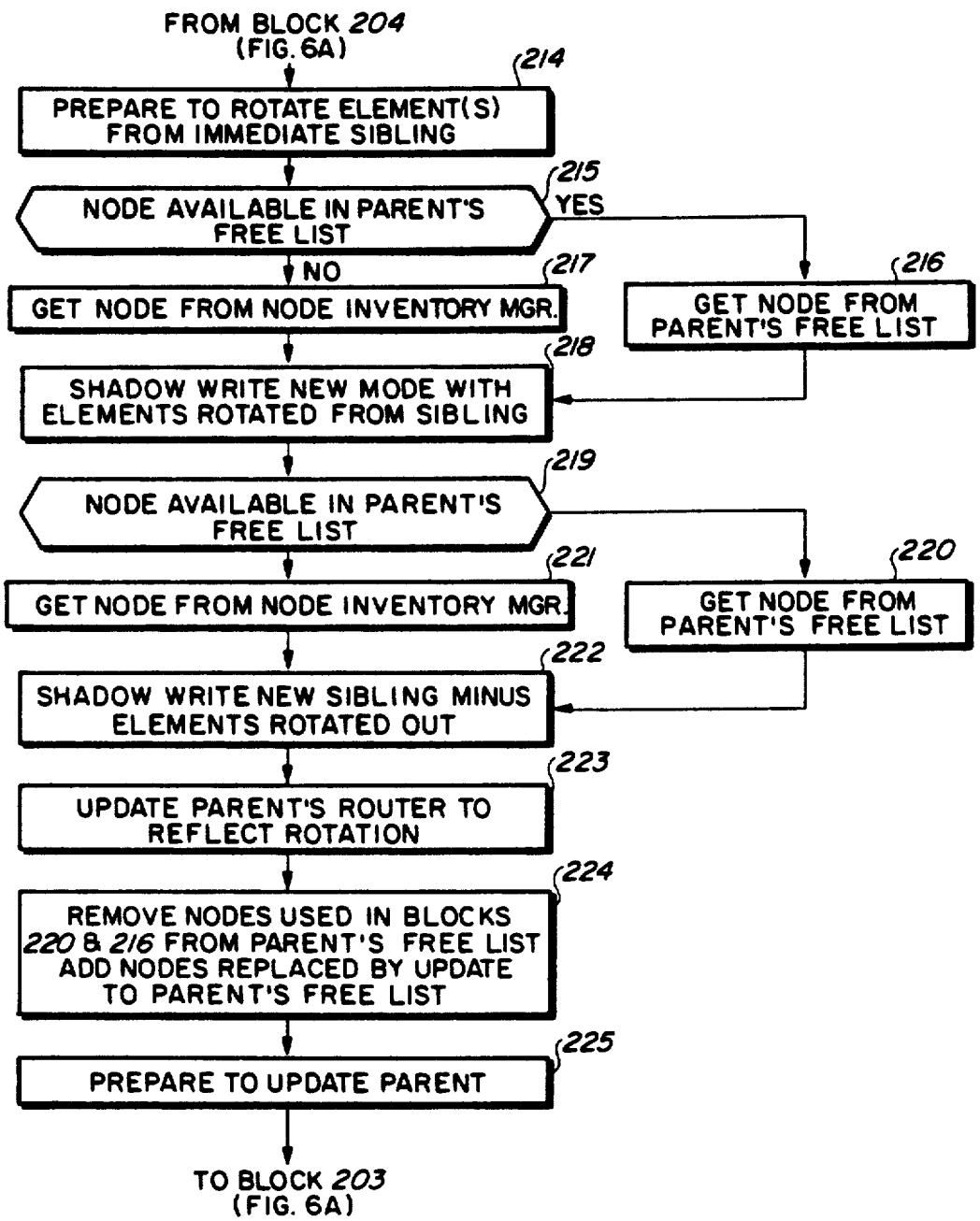

Referring now to FIGS. 6A-6B, there is shown method steps for the deletion of an element in the B-tree. The standard B-tree search technique is used to find the leaf node that contains the element to be deleted (200). An appropriate locking protocol is used to lock the update scope.

A DELETE process locks its scope using a locking protocol in the same way as the INSERT process. The target element is then deleted with a possible consequent merge (due to underflow) until a key rotation or deletion in the deletion-safe node occurs. Note, an immediate sibling is adjacent in the common parent. Therefore, the nodes designated by the leftmost and rightmost pointers have only one immediate sibling. All other successors of a parent node have two.

If the deletion of the element will not cause an underflow in the node then the element is deleted and the node written in place (201-203). If the deletion causes an underflow then an immediate sibling is checked to see if the two nodes can be joined into one (204). If they can then they will be combined into a new node which is shadow written. The parent's free space list is checked for the availability of a node (205). If one is available it is used (207) otherwise a new node is obtained from the node inventory manager at 206. The new node containing the merged contents of the two sibling nodes is then shadow written at 208. If a node was obtained at 207, then it is deleted from the parent's free list (209).

If the addition of the two replaced node's to the parent's free list will cause one node to overflow (i.e., the list was previously full) then the node with the least locality from the combined set is returned to the node inventory manager at 211. Both replaced nodes are placed in the free list (212). The merge just performed will cause a router to be deleted in the parent so the parent node is selected and processing iterates back to 201 to check for underflow due to the next deletion.

If at 204 it is determined that the two nodes can not be joined (i.e., there are more than (m/2) elements in the immediate successor), then the two nodes are balanced by "rotating" elements from the immediate successor so that the node undergoing deletion no longer underflows (214-226). Nodes are obtained from the predecessor parent if possible (216 and 220) or otherwise from the node inventory manager (217 and 221) in order to shadow write the newly "balanced" nodes resulting from this rotation (logic block 218 and 222). Then the router in the parent is updated to reflect the new dividing key between the two rotated nodes (223) and the parent's free list is updated to remove nodes obtained at 216 and 220 and to add the nodes replaced by the rotation (224). The parent node is then written in-place (225 and 203).

These and other extensions of the invention may be made without departing from the spirit and scope thereof as recited in the appended claims.

We claim:

1. A method for managing space re-use with respect to the key oriented, tree organized indices of dynamic random accessible files, said indices and files being located in and shadow written to a store of a CPU, each index having a root node, interior nodes, and exterior nodes, all keys to the files appearing in the exterior nodes, all interior nodes including routing pointers and synchronization values to external nodes, said interior nodes being either split or combined so as to avoid under and overflow of the bounded space allocated to said interior nodes, said CPU having resource managers including a manager of assignable nodes, the method comprising the steps of:

(a) reserving storage space associated with each of the interior nodes and maintaining a list of available node addresses, said reversed space initially permitting contiguity in the store of the exterior nodes;

(b) responsive to the creation of a new node, obtaining storage space, if available, from the list of an interior node operative as a parent node to the new node, otherwise obtaining space from the node manager;

(c) responsive to deletion of a node, causing the address of the deleted node to be placed on the free or available list maintained by an interior node operative as the parent to the deleted node, otherwise if the list capacity would be exceeded by acceptance of the deleted node, then accepting said deleted node and returning to the node manager that node on the list maintained by the parent node having the least locality with the existing subordinate nodes of the parent node; and (d) responsive to either creating or deleting a node, updating changes to the indices including synchronization values and updating changes to the lists as an indivisible constituent of steps (b) or (c).

2. A CPU implemented method for managing insertion and deletion of elements in B-tree organized key oriented indices of files defined and shadow written onto a system managed storage (SMS) portion of a computing system, said SMS including a global space manager and means for establishing index lockable paths to said files, each B-tree index including a root node, interior nodes, and exterior nodes, all keys to the files appearing in the exterior nodes (leaves), all interior (non-leaf) nodes including routing pointers and synchronization values, said nodes being split (split ops) or combined (join ops) in order to avoid overflow or underflow of nodes whose associated number of elements is bounded, updating or deletion of any file resulting in the alteration of the synchronized values of nodes in the access paths to those external nodes containing keys to the updated file, the method comprising the steps of:

(a) defining leaf search B-tree access paths over SMS;

(b) defining a bounded free space list over each of the non-leaf nodes of said B-tree; and (c) responsive to dynamic change in B-tree join and split ops in avoidance of under and overflow, re-using the space assigned to a node of deleted subordinate nodes and updating changes to the indices and to indicia of space usage, said updating includes appending subordinate nodes, now deleted, to the free space list of a predecessor node, if the capacity of any list being so updated would be exceeded by acceptance of the deleted node, then accepting said deleted node and returning to the SMS space manager that node on the list maintained by the predecessor node having the least locality with the existing subordinate nodes of the predecessor node both re-using and updating being steps included within an atomic operation.

whereby contiguity of leaf nodes in SMS is maintained within some granule (DASD track or cylinder) of storage performance reference.

3. The method according to claim 2, wherein a B-tree of order m in which a node is to have an element inserted comprising the further steps of:

(d) if said node would not overflow as a result of insertion of an element (have more than $m-1$ elements assigned thereto), writing said node and the appended element in place to the SMS, otherwise;

(e) replacing said node with a pair of nodes including the inserted element, the node pairs having respectively nearest integer value of $m/2$ and the remaining elements, and writing said pair of nodes to new locations in the SMS, said replacement step including ascertaining whether a node is available in the free space list appending said nodes predecessor, and if not available, obtaining the same from the SMS space manager; and (f) inserting new routing pointers and synchronization values in a predecessor node having less than $(m-1)$ elements assigned thereto, and (g) writing said predecessor node in place in the SMS.

4. The method according to claim 2, wherein step (c) further includes in a B-tree of order m in which a node is to have an element deleted, the steps of:

(h) if said node would not underflow (have less than the nearest integer value of $m/2$ elements) as a result of deletion of an element, writing said node with the element deleted therefrom in place to the SMS; otherwise, (i) replacing said node with element deleted with a pair of nodes, said replacement step includes rotating up to $m/2$ elements of a sibling node into the first node of the pair of merging said first node of the pair with said node with the element deleted therefrom, and rotating the remaining elements of the sibling node into the second node of the pair, and writing said node pair to new locations in the SMS, said replacement step further including ascertaining whether a node is available in the free space list appending said nodes predecessor, and if not available, obtaining the same from the SMS; and (j) inserting new routing pointers and synchronization values in a predecessor node having less than $(m-1)$ elements assigned thereto, and (k) writing said predecessor node in place in the SMS.

5. A CPU implemented method for node insertion of elements in B-tree organized key oriented indices of files defined and shadow written onto a system managed storage (SMS) portion of a computing system, said SMS establishing index lockable paths to said files, each B-tree index including a root node, interior nodes, and exterior nodes, all keys to the files appearing in the exterior nodes (leaves), all interior (non-leaf) nodes including routing pointers and synchronization values, said nodes being split (split ops) or combined (join ops) in order to avoid overflow or underflow of nodes whose associated information capacity is bounded, updating or deletion of any file resulting in the alteration of the synchronized values of nodes in the access paths to those external nodes containing keys to the updated file, comprising the steps of:

(a) defining a bounded free space list over each of the interior nodes of the tree;

(b) ascertaining the node to which a new element is to be appended and locking the update scope (minimal subtree defining path from deepest safe interior node to the ascertained node);

(c) ascertaining whether insertion of the new element would result in information overflow at the ascertained node, and (1) either appending the new element to the ascertained node and writing the update in place in the absence of overflow, or (2) replacing the ascertained node with a pair of nodes including the appended new element, writing said pair of nodes to new locations in the SMS, inserting new routing pointers and synchronization values in a predecessor node having less than (m−1) elements assigned thereto, and writing said predecessor node in place in the SMS, said node pair having respectively the nearest integer value to m/2 and the remaining elements. said replacement step including ascertaining whether a node is available in the free space list appending said nodes predecessor, and if not available, obtaining the same from the SMS, said substeps (1), (2) and (3) being executed as an atomic operation.

6. In a computer system having:

(a) a processor including an operating system defining a functional computer system image; and (b) a subsystem coupling said processor including means for storing and shadow writing B-tree organized key oriented indices and files; and a systems storage manager (SMS) for establishing an index lockable paths to said files and for managing storage space use and allocation within said subsystem, each B-tree index within said subsystem including a root node, interior nodes, and exterior nodes, all keys to the files appearing in the exterior nodes (leaves), all interior (non-leaf) nodes including routing pointers and synchronization values, each interior node having an upper bound of elements capable of being associated therewith, an improvement comprising:

(c) means for updating or deleting any file resulting in the alteration of the synchronized values of nodes in the access paths to those external nodes containing keys to the updated file;

(d) means responsive to updating or deleting of any file for splitting nodes (split ops) or combining nodes (join ops) in order to avoid overflow or underflow of nodes in the bounded space associated therewith;

(e) means for defining leaf search B-tree access paths over said subsystem;

(f) means for defining a bounded free space list over each of the non-leaf nodes of said B-tree; and (g) means responsive to dynamic change in B-tree join and split ops in avoidance of under and overflow, for re-using the space assigned to a node of deleted subordinate nodes (successors), and for updating changes to the indices and to indicia of space usage as included steps within an atomic operation, said updating includes appending subordinate nodes, now deleted, to the free space list of a predecessor node, if the capacity of any list being so updated would be exceeded by acceptance of the deleted node, then accepting said deleted node and returning to the SMS space manager that node on the list maintained by the predecessor node having the least locality with the existing subordinate nodes of the predecessor node, whereby contiguity of leaf nodes in the subsystem is maintained within some granule (DASD track or cylinder) of storage performance reference.

* * * * *

UNITED STATES PATENT AND TRADEMARK OFFICE
CERTIFICATE OF CORRECTION

PATENT NO. : 5,261,088
DATED : November 9, 1993
INVENTOR(S) : R. Baird et al.

It is certified that error appears in the above-indentified patent and that said Letters Patent is hereby corrected as shown below:

Column 9, line 66, after "of the" insert --new nodes containing (m/2)--.
Column 11, line 68, after "node", insert --predecessor--.
Column 12, line 1, after "nodes", insert --successors--.
Column 12, line 48, after "the pair", delete "of", insert --and--.
Column 14, line 27, after "node", insert --predecessor--.

Signed and Sealed this

Sixteenth Day of August, 1994

BRUCE LEHMAN

*Attest:*

*Attesting Officer*     Commissioner of Patents and Trademarks